United States Patent
Zeng

(10) Patent No.: US 11,282,210 B2
(45) Date of Patent: Mar. 22, 2022

(54) METHOD AND APPARATUS FOR SEGMENTING POINT CLOUD DATA, STORAGE MEDIUM, AND ELECTRONIC DEVICE

(71) Applicant: Tencent Technology (Shenzhen) Company Limited, Shenzhen (CN)

(72) Inventor: Chao Zeng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/019,067

(22) Filed: Sep. 11, 2020

(65) Prior Publication Data

US 2020/0410690 A1    Dec. 31, 2020

Related U.S. Application Data

(63) Continuation of application No. PCT/CN2019/102486, filed on Aug. 26, 2019.

(30) Foreign Application Priority Data

Aug. 27, 2018  (CN) .......................... 201810982858.0

(51) Int. Cl.
  *G06T 7/12* (2017.01)
  *G06T 7/521* (2017.01)
  *G06K 9/62* (2022.01)

(52) U.S. Cl.
  CPC .............. *G06T 7/12* (2017.01); *G06K 9/6218* (2013.01); *G06T 7/521* (2017.01); *G06T 2207/10028* (2013.01); *G06T 2207/30252* (2013.01)

(58) Field of Classification Search
  CPC . G06T 7/12; G06T 7/521; G06T 2207/10028; G06T 2207/30252; G06K 9/6218
  See application file for complete search history.

(56) References Cited

U.S. PATENT DOCUMENTS 8,050,491 B2 * 11/2011 Vaidyanathan ......... G06T 7/521
                                                       382/154
9,025,861 B2 *  5/2015 Furukawa ............... G06T 17/00
                                                       382/154

(Continued)

FOREIGN PATENT DOCUMENTS

CN    101702200 A     5/2010
CN    105046710 A    11/2015

(Continued)

OTHER PUBLICATIONS

Tencent Technology, ISR, PCT/CN2019/102486, dated Nov. 26, 2019, 2 pgs.

(Continued)

*Primary Examiner* — Gregory M Desire
(74) *Attorney, Agent, or Firm* — Morgan, Lewis & Bockius LLP

(57) ABSTRACT

This application discloses a method and apparatus for segmenting point cloud data, a storage medium and an electronic device. The method includes: obtaining target point cloud data by scanning target objects around a vehicle with laser lines; clustering the target point cloud data to obtain a plurality of first datasets, wherein feature points represented by point cloud data within each of the plurality of first datasets are fitted on one segmented line segment, each feature point being a point on a respective target object; and combining the plurality of first datasets according to distances between the corresponding plurality of segmented line segments to obtain a plurality of second datasets, wherein each second dataset includes at least one of the (Continued)

plurality of first datasets. This application resolves a technical problem of relatively low efficiency of point cloud segmentation in the related art.

20 Claims, 6 Drawing Sheets

(56) References Cited

U.S. PATENT DOCUMENTS

| | | | |
|---|---|---|---|
| 9,436,987 B2* | 9/2016 | Ding | G06T 7/187 |
| 9,811,714 B2* | 11/2017 | Fu | G06K 9/00201 |
| 9,846,946 B2* | 12/2017 | Fan | G06T 7/75 |
| 10,268,917 B2* | 4/2019 | Poelman | G06T 15/04 |
| 10,345,447 B1* | 7/2019 | Hicks | G01S 7/486 |
| 10,528,851 B2* | 1/2020 | Zhu | G06T 5/30 |
| 10,565,787 B1* | 2/2020 | Jordan | G06T 7/33 |
| 2018/0253625 A1* | 9/2018 | Jiang | G01C 21/32 |
| 2021/0302157 A1* | 9/2021 | Wang | G01C 5/00 |

FOREIGN PATENT DOCUMENTS

| | | |
|---|---|---|
| CN | 108010116 A | 5/2018 |
| CN | 110148144 A | 8/2019 |
| WO | WO 2016068869 A1 | 5/2016 |

OTHER PUBLICATIONS

Tencent Technology, WO, PCT/CN2019/102486, dated Nov. 26, 2019, 5 pgs.
Tencent Technology, IPRP, PCT/CN2019/102486, dated Mar. 2, 2021, 6 pgs.

* cited by examiner

METHOD AND APPARATUS FOR SEGMENTING POINT CLOUD DATA, STORAGE MEDIUM, AND ELECTRONIC DEVICE

CROSS REFERENCE TO RELATED APPLICATIONS

This application is a continuation application of PCT Patent Application No. PCT/CN2019/102486, entitled "METHOD AND APPARATUS FOR SEGMENTING POINT CLOUD DATA, STORAGE MEDIUM, AND ELECTRONIC DEVICE" filed on Aug. 26, 2019, which claims priority to Chinese Patent Application No. 201810982858.0, entitled "METHOD AND APPARATUS FOR SEGMENTING POINT CLOUD DATA, STORAGE MEDIUM, AND ELECTRONIC DEVICE" filed on Aug. 27, 2018, all of which are incorporated by reference in their entirety.

FIELD OF THE TECHNOLOGY

This application relates to the field of autonomous driving, and specifically, to a technology of segmenting point cloud data.

BACKGROUND OF THE DISCLOSURE

Three-dimensional reconstruction for large scenes has attracted much attention because of its important application in aspects such as three-dimensional city maps, road maintenance, urban planning, and autonomous driving. Collecting three-dimensional information of a surrounding environment by using a depth sensor and a position and attitude sensor based on a fixed station or a mobile platform is widely adopted due to its features of high efficiency, real-time, and high precision. Because a scanned scene may include different objects such as the ground, a building, a tree, and a vehicle, before three-dimensional reconstruction is performed, point cloud data belonging to different objects needs to be segmented through point cloud segmentation, to help separately perform point cloud modeling for each object.

In a point cloud segmentation algorithm in the related art, point cloud data needs to be scanned a plurality of times, resulting in high calculation costs and low efficiency, and consequently, real-time processing requirements are not satisfied.

For the foregoing problem, no effective solutions have been provided yet.

SUMMARY

Embodiments of this application provide a method and an apparatus for segmenting point cloud data, a storage medium, and an electronic device, to resolve at least a technical problem of low efficiency of point cloud segmentation in the related art.

According to an aspect of the embodiments of this application, a method for segmenting point cloud data is provided, including: obtaining target point cloud data by scanning target objects around a vehicle with laser lines; clustering the target point cloud data to obtain a plurality of first datasets, wherein feature points represented by point cloud data within each of the plurality of first datasets are fitted on one segmented line segment, each feature point being a point on a respective target object; and combining the plurality of first datasets according to distances between the corresponding plurality of segmented line segments to obtain a plurality of second datasets, wherein each second dataset includes at least one of the plurality of first datasets.

According to another aspect of the embodiments of this application, a non-transitory computer-readable storage medium is further provided. The non-transitory computer-readable storage medium includes a plurality of computer programs, the computer programs, when executed by a processor of a computing device, cause the computing device to perform the foregoing method.

According to another aspect of the embodiments of this application, a computing device is further provided. The computing device includes memory, a processor, and a plurality of computer programs stored on the memory that, when executed by the processor, cause the computing device to perform the foregoing method by using the computer program.

In the embodiments of this application, target point cloud data is obtained, the target point cloud data being data obtained by scanning target objects around a vehicle with laser lines; the target point cloud data is clustered to obtain a plurality of first datasets, feature points represented by point cloud data included in each of the first datasets being fitted on one segmented line segment, the feature point being a point on the target object; and the plurality of first datasets are combined according to distances between a plurality of segmented line segments to obtain second datasets, the second dataset including at least one of the first datasets. During segmentation, the "clustering the target point cloud data to obtain a plurality of first datasets" is equivalent to completing point cloud data segmentation by merely traversing all point cloud data once instead of completing segmentation by traversing point cloud data a plurality of times in the related art, so that a technical problem of relatively low efficiency of point cloud segmentation in the related art can be resolved, to further achieve a technical effect of improving segmentation efficiency.

BRIEF DESCRIPTION OF THE DRAWINGS

The accompanying drawings described herein are used for providing a further understanding of this application, and form a part of this application. Exemplary embodiments of this application and descriptions thereof are used for explaining this application, and do not constitute any inappropriate limitation to this application. In the accompanying drawings.

DESCRIPTION OF EMBODIMENTS

To make solutions of this application more comprehensible for a person skilled in the art, the technical solutions in embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

The terms such as "first" and "second" in the specification, claims, and foregoing accompanying drawings of this application are intended to distinguish between similar objects rather than describe a particular sequence or a chronological order. It is to be understood that the data termed in such a way is interchangeable in proper circumstances, so that the embodiments of this application described herein can be implemented in other orders than the orders illustrated or described herein. In addition, the terms "comprise", "include" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

First, some nouns or terms that appear during descriptions of the embodiments of this application are applicable to the following explanations:

An autonomous vehicle or a self-piloting automobile is also referred to as a driverless automobile, a computer driving automobile, or a wheeled mobile robot, and is an intelligent automobile implementing driverless driving by using a computer system.

A high-precision map refers to a map having high precision and precise definitions, and lanes can only be distinguished when precision of the high-precision map reaches a decimeter level. Nowadays, with the development of positioning technologies, high-precision positioning has become possible. Moreover, for the precise definitions, various traffic elements in a traffic scene, including data, such as road network data, lane network data, lane lines, and traffic signs, in a conventional map, need to be stored in a formatted manner.

According to an aspect of the embodiments of this application, a method embodiment of a method for segmenting point cloud data is provided.

Figure 1:
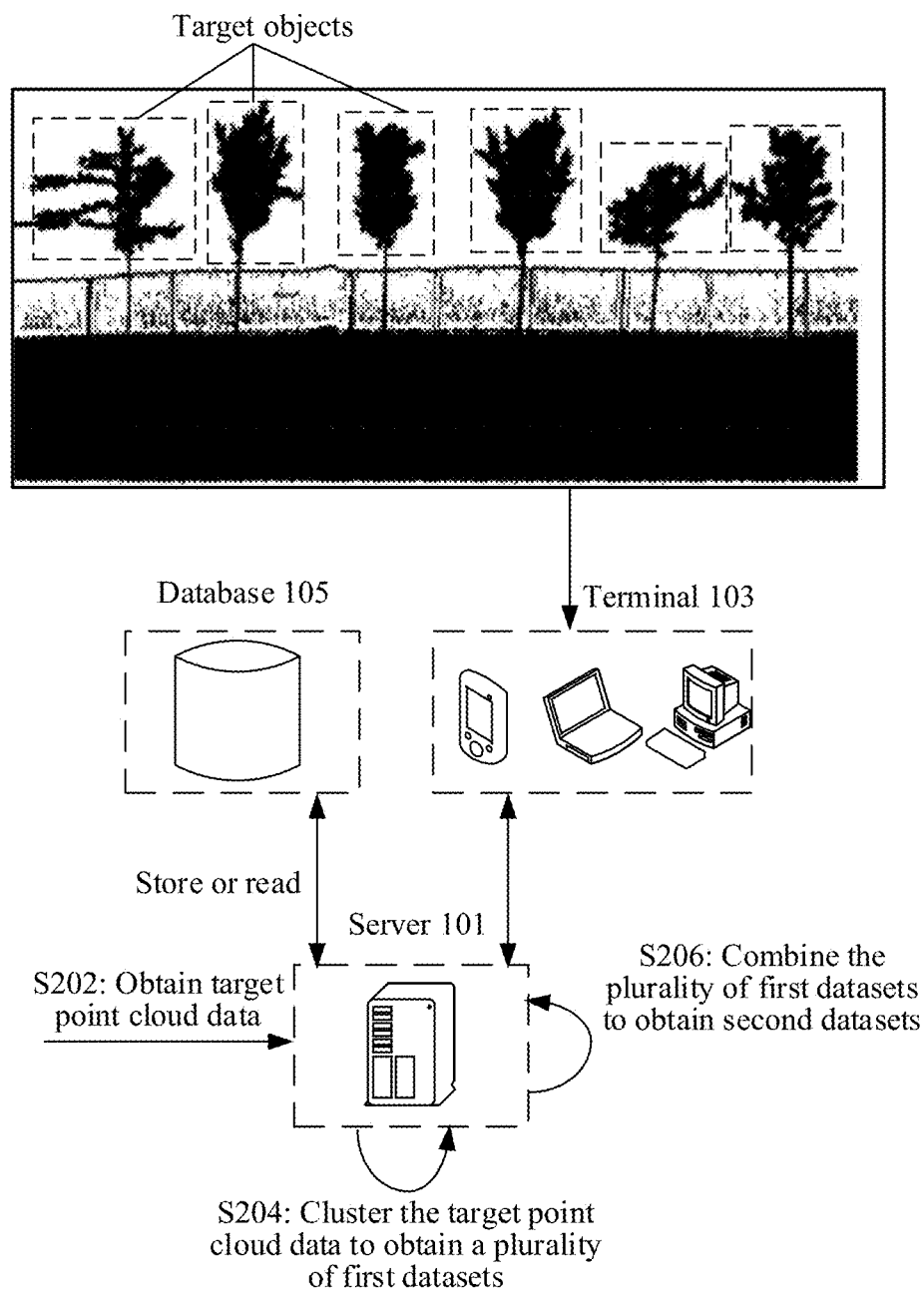
FIG. 1 is a schematic diagram of a hardware environment of a method for segmenting point cloud data according to an embodiment of this application.

Optionally, in this embodiment, the method for segmenting point cloud data may be applied to a hardware environment including a server 101 and/or a terminal 103 shown in FIG. 1. As shown in FIG. 1, the server 101 is connected to the terminal 103 through a network, and can be used for providing a service (such as a game service, an application service, a map service, or autonomous driving) for the terminal or a client installed on the terminal. A database 105 may be set on the server 101 or independently of the server 101, and is used for providing a data storage service for the server 101. The foregoing network includes, but is not limited to, a wide area network, a metropolitan area network, or a local area network, and the terminal 103 may be an intelligent terminal device used in a vehicle, but is not limited to an in-vehicle device, a mobile phone, a tablet computer, or the like.

Figure 2:
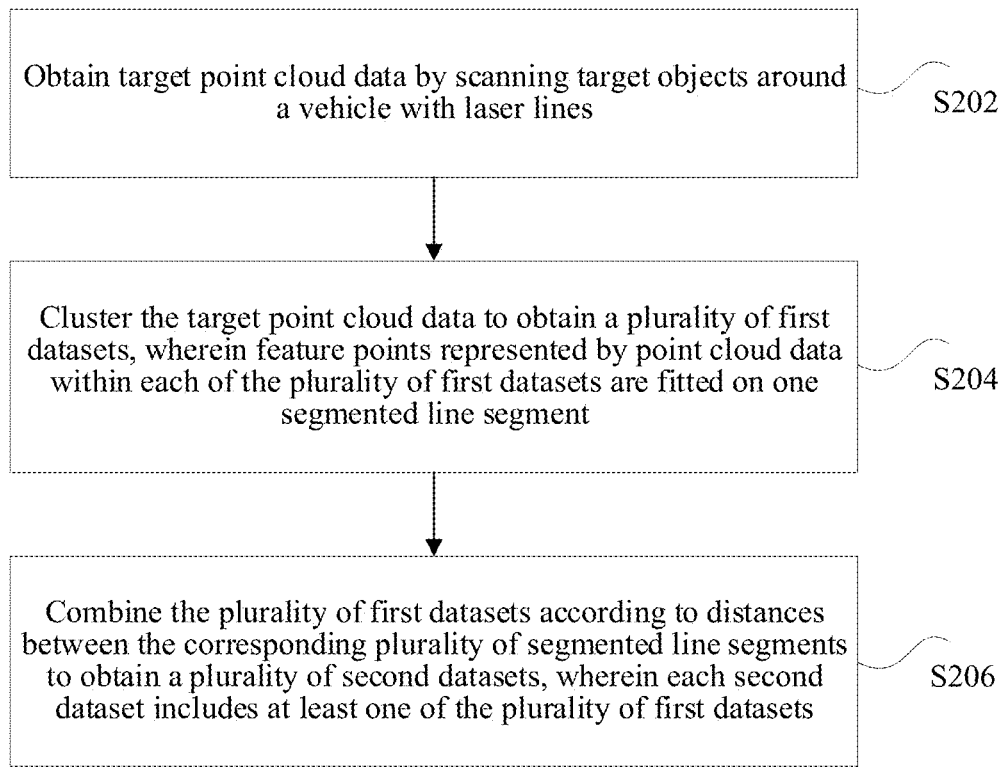
FIG. 2 is a flowchart of an optional method for segmenting point cloud data according to an embodiment of this application.

The method for segmenting point cloud data in this embodiment of this application may be performed by the server 101. FIG. 2 is a flowchart of an optional method for segmenting point cloud data according to an embodiment of this application. As shown in FIG. 2, the method may include the following steps:

Step S202: The server obtains target point cloud data.

The target point cloud data is data obtained by scanning target objects around a vehicle with laser lines. In an implementation, the target point cloud data may be data obtained through scanning by a plurality of laser lines of a laser radar. The laser radar may measure a size, a shape, and the like of an object by using a scanning technology. In the laser radar, a rotation motor having good stability and high precision may be used. When a laser line is cast to and reflected by a polygon driven by the motor, to form scanning beams, because the polygon is located on a front focal plane of a scanning lens, and uniformly rotates to enable an incident angle of the laser line to continuously vary relative to a reflector, a reflection angle also continuously varies. Parallel scanning lines from top to bottom in a consecutive manner are formed through a function of the scanning lens, to form scanning line data, that is, a point cloud sequence formed through one time of scanning by a single-line laser.

The laser radar in this application may be a low-line laser radar or a multi-line laser radar. The low-line laser radar may generate a relatively small quantity of scanning lines by performing scanning once, generally includes 4 lines or 8 lines, and is mainly a 2.5D laser radar with a vertical field of view not greater than 10°. The multi-line laser radar (or referred to as a 3D laser radar) may generate a plurality of scanning lines by performing scanning once, and generally includes 16 lines, 32 lines, 64 lines, or the like. A largest difference between the 3D laser radar and the 2.5D laser radar lies in vertical fields of view of the laser radars. A vertical field of view of the 3D laser radar may reach 30° or even 40° or above.

In an advanced driver assistance system (ADAS), an active safety technology of collecting environment data inside and outside a vehicle in time by using various sensors mounted on the vehicle need to perform technical processing such as recognition, detection, and tracing of static and dynamic objects is needed, to enable a driver to be aware of a possible danger in a shortest time, thereby drawing attention and improving safety. The sensors used in the ADAS mainly include a camera, a laser radar, and the like, and when the vehicle detects a potential danger, the sensors give an alarm to remind the driver to notice an abnormal vehicle or road conditions. In this case, the target objects may be static and dynamic objects and the like outside the vehicle, and are objects used for determining existence of a potential danger and assisting in driving logic determining, for example, a building, a pedestrian, another vehicle, an animal, and traffic lights.

Step S204: The server clusters the target point cloud data to obtain a plurality of first datasets.

Feature points represented by point cloud data included in each of the first datasets are fitted on one segmented line segment. That is, feature points represented by point cloud data stored in a first dataset are located on a segmented line segment corresponding to the first dataset. The feature point is a point on the target object. The step is equivalent to that a segmentation method based on scanning lines, where each scanning line is segmented to obtain segmented line segments on the scanning line, thereby implementing initial segmentation of all pieces of point cloud data, for example, obtaining datasets of boundaries of the target objects, datasets of appearances of the target objects, a dataset of the ground, and the like.

Step S206: The server combines the plurality of first datasets according to distances between the corresponding plurality of segmented line segments to obtain a plurality of second datasets.

Each of the second datasets includes at least one of the first datasets. The step is equivalent to combining segmented line segments of the scanning lines by using a plane scanning method, to obtain candidate target cluster sets. After the candidate target cluster sets are obtained, feature extraction is performed on the candidate target cluster sets, and noise and ground sets are removed, to obtain final segmentation results, that is, the second datasets and segmented line segments after combination.

By analyzing the related art, the applicant learns that most point cloud segmentation methods in the related art are to process disordered and discrete point cloud data. In the point cloud segmentation methods, a clustering segmentation method may be used for space point cloud segmentation because the method has low complexity and is easy to implement. However, because of existence of ground point cloud data in a large outdoor scene, it is difficult to segment the ground and non-ground objects effectively by using the clustering method.

In an optional embodiment, for non-ground point cloud clustering segmentation, a clustering segmentation method based on a radius with a fixed threshold may be used, and selection of the threshold has large impact on a segmentation result. If a selected threshold is excessively large, small objects having a relatively short spacing distance may not be separated but be regarded as one object (that is, under-segmentation occurs); and if a selected threshold is excessively small, an object having a relatively long spacing distance (for example, a building) may be segmented into different objects (that is, over-segmentation occurs).

In this embodiment of this application, the segmented line segments (which may be referred to as segments for short) on scanning lines are first obtained based on segmentation methods of the scanning lines, and each of the segmented line segments corresponds to one first dataset, so that object contours may be preliminarily segmented; and then the segments of the scanning lines are combined by using a plane scanning method, to obtain the candidate target cluster sets (that is, the second datasets). The above is equivalent to combining contour lines belonging to the same object. Because the target point cloud data only needs to be traversed once, a problem that when merely clustering segmentation is used, efficiency is low and ground and non-ground objects are difficult to effectively segment can be resolved. In addition, in the solution of this application, merely distances between segmented line segments need to be determined, so that compared with distances between point clouds, there is no contingency factor (due to a viewing angle factor, some point clouds overlap in a plane dimension but do not actually overlap in space) for determining distances between point clouds. In addition, a problem of under-segmentation or over-segmentation occurring during segmentation directly performed on a point cloud by using the clustering segmentation method based on a radius of a fixed threshold can be avoided. It can be learned that, the technical solution of this application not only reduces algorithm complexity, but also helps reduce under-segmentation and over-segmentation phenomena occurring in a segmentation process, thereby improving sensing robustness of autonomous driving.

In the foregoing embodiment, a description is provided by using an example in which the method for segmenting point cloud data in this application is performed by the server 101. The method for segmenting point cloud data in this application may alternatively be performed by the terminal 103, and differs from the foregoing embodiment in that an execution body is changed from a server to a terminal. The method for segmenting point cloud data in this application may alternatively be jointly performed by the server 101 and the terminal 103. The terminal 103 performs one or two steps (for example, step S202) in the method, and the server 101 performs the remaining steps (for example, step S204 to step S206). The method for segmenting point cloud data in this embodiment of this application performed by the terminal 103 may alternatively be performed by a client installed on the terminal 103.

Through the foregoing step S202 to step S206, target point cloud data is obtained, the target point cloud data being data obtained by scanning target objects around a vehicle with laser lines; the target point cloud data is clustered to obtain a plurality of first datasets, feature points represented by point cloud data included in each of the first datasets being fitted on one segmented line segment, the feature point being a point on the target object; and the plurality of first datasets are combined according to distances between a plurality of segmented line segments to obtain second datasets, the second dataset including at least one of the first datasets. During segmentation, the "clustering the target point cloud data to obtain a plurality of first datasets" is equivalent to completing point cloud data segmentation by merely traversing all point cloud data once instead of completing segmentation by traversing point cloud data a plurality of times in the related art, so that a technical problem of relatively low efficiency of point cloud segmentation in the related art can be resolved, to further achieve a technical effect of improving segmentation efficiency.

With mass production of low-line laser radars, accurate segmentation of point cloud data based on a low-line laser is a basic premise for implementing obstacle detection and tracing, and has great significance in sensing technologies for driverless driving. A method for quickly segmenting point cloud data based on a low-line laser (the method is also applicable to a multi-line laser radar) provided in this application not only reduces computation complexity, but also helps reduce over-segmentation and under-segmentation phenomena occurring in a segmentation process, thereby improving sensing robustness of autonomous driving. The technical solution of this application is described below in detail with reference to steps shown in FIG. 2.

Optionally, in the technical solution provided in step S202, the technical solution of this application may be applied to the field of autonomous driving; to enable the server to obtain the target point cloud data, a laser sensor (or referred to as a laser radar) may be mounted on the vehicle; and to reduce costs, the laser radar may be a low-line laser radar. In this way, when the target point cloud data is obtained, the target point cloud data may be obtained by scanning target objects around the vehicle with the laser sensor mounted on the vehicle. The vehicle may be a vehicle having an autonomous driving system.

In the technical solution provided in step S204, the server clusters the target point cloud data to obtain a plurality of first datasets, feature points represented by point cloud data included in each of the first datasets being fitted on one segmented line segment, the feature point being a point on the target object.

In the foregoing embodiment, when the target point cloud data is clustered to obtain the plurality of first datasets, each of the first datasets may be created in the following manner (including step 1 and step 2):

Step 1: Search the target point cloud data for a plurality of pieces of first point cloud data, feature points represented by the plurality of pieces of first point cloud data being adjacent.

Optionally, the searching the target point cloud data for a plurality of pieces of first point cloud data includes: using point cloud data that is in the target point cloud data and that represents features points having a distance not greater than a first threshold and an angle formed not less than a second threshold as the plurality of pieces of first point cloud data. An optional implementation is as follows:

Step 11: Obtain second point cloud data in the target point cloud data, the second point cloud data being point cloud data that is in the target point cloud data and that is not clustered into any one of the first datasets.

For example, point cloud data is sequentially obtained according to a collection time of point cloud data in the target point cloud data. For example, the point cloud data in the target point cloud data is obtained in chronological order (reverse chronological order) by a collection time. Generally, parts (such edges, surfaces, and edge angles) that can become features of a target object (for example, an obstacle) are usually adjacent in terms of position, and the laser radar also sequentially scans the target objects according to positions. In other words, point cloud data whose collection times are adjacent is used for representing feature points whose positions are adjacent. It can be learned that in each of the first datasets, a plurality of pieces of second point cloud data whose collection times are adjacent are usually retained. In other words, the foregoing solution is to segment continuous point cloud data into a plurality of segments, and point cloud data in each of the segments is stored in one first dataset.

Optionally, the foregoing target point cloud data may alternatively be fitted, and lines (that is, segmented line segments) may be obtained. Distances between the lines may be defined to not exceed a threshold. When a distance between two points of a position exceeds the threshold, it can be determined that the two points are endpoints of lines on which the two points are respectively located, and further a plurality of lines may be determined. Point cloud data corresponding to all points on each of the lines are used as a first dataset.

Step 12: Obtain point cloud data whose collection time is later than that of the second point cloud data (recorded as third point cloud data).

The second point cloud data is equivalent to initial point cloud data in a first dataset, and after this, ending point cloud data of the first dataset needs to be found. The third point cloud data is point cloud data that is in the target point cloud data, that is not clustered into any one of the first datasets, and whose collection time is later than that of the second point cloud data.

Step 13: Obtain a distance between a first feature point A represented by the third point cloud data and a second feature point B represented by fourth point cloud data (that is, point cloud data whose collection time is later than and adjacent to that of the third point cloud data) and an angle (that is, a degree of $\angle ABC$) formed by the first feature point A represented by the third point cloud data, the second feature point B represented by the fourth point cloud data, and a third feature point C represented by fifth point cloud data.

Step 14: Use the second point cloud data, the third point cloud data, and point cloud data whose collection time is between the collection time of the second point cloud data and the collection time of the third point cloud data as the plurality of pieces of first point cloud data in a case that the distance between the feature point represented by the third point cloud data and the feature point represented by the fourth point cloud data is greater than the first threshold (the first threshold is used for representing a largest spacing distance between adjacent feature points of one feature of an obstacle, for example, a largest distance between pixels on an edge of a building), and the angle formed by the feature point represented by the third point cloud data, the feature point represented by the fourth point cloud data, and the feature point represented by the fifth point cloud data is less than the second threshold (the second threshold is used for representing a largest turning angle between adjacent feature points of one feature of an obstacle).

In other words, the third point cloud data is equivalent to ending point cloud data of the first dataset; the third point cloud data and the fourth point cloud data are point cloud data whose collection times are adjacent, the collection time of the fourth point cloud data being later than the collection time of the third point cloud data; the fourth point cloud data is equivalent to initial point cloud data of a next first dataset; and the fourth point cloud data and the fifth point cloud data are point cloud data whose collection times are adjacent, an collection time of the fifth point cloud data being later than the collection time of the fourth point cloud data.

Step 15: Store, in a case that the distance between the feature point represented by the third point cloud data and the feature point represented by the fourth point cloud data is greater than the first threshold, and the angle formed by the feature point represented by the third point cloud data, the feature point represented by the fourth point cloud data, and the feature point represented by the fifth point cloud data is less than the second threshold, the fourth point cloud data into another first dataset different from the first dataset used for storing the third point cloud data.

Step 2: Store the plurality of pieces of first point cloud data into one created first dataset.

Subsequent point cloud data may be processed according to the foregoing step 1 and step 2 until there is no point cloud data in the target point cloud data.

By using the technical solution provided in step S204, preliminary segmentation of point cloud data can be implemented.

In the technical solution provided in step S206, the server combines the plurality of first datasets according to distances between the plurality of segmented line segments to obtain second datasets, the second dataset including at least one of the first datasets.

In the foregoing embodiment, when the plurality of first datasets are combined according to the distances between the plurality of segmented line segments to obtain the second datasets, first datasets that are in the plurality of first datasets and that have distances between segmented line segments obtained through fitting less than a third threshold may be combined, to obtain the second datasets. An optional implementation may include the following step 1 to step 6:

Step 1: Create an event set.

The event set stores events of the plurality of segmented line segments corresponding to the plurality of first datasets according to a collection time of point cloud data in the plurality of first datasets, the events of the segmented line segments including insertion events corresponding to initial feature points of the segmented line segments and deletion events corresponding to ending feature points of the segmented line segments.

Step 2: Traverse each event in the event set.

Step 3: Store, in a case that a current traversed event is an insertion event, a first segmented line segment in the plurality of segmented line segments that corresponds to the current event into a segment set.

Optionally, point cloud data on each segmented line segment is point cloud data having a continuous collection time, and it is equivalent to that point cloud data on each segmented line segment may correspond to a period of collection time. Therefore, the events of the segmented line segments may be stored in the event set according to collection times of the segmented line segments. For example, for different segmented line segments, an event of a segmented line segment having an earliest collection time is arranged at the head of a queue, an event of a segmented line segment having a second earliest collection time is arranged following the head of the queue, and so on.

Step 4: Use a first dataset corresponding to the first segmented line segment as a third dataset in a case that the current event is a deletion event and there is no second segmented line segment in the segment set.

The second segmented line segment is a segmented line segment in the segment set that has a distance to the first segmented line segment less than the third threshold (the third threshold may be a parameter used for determining whether two segmented line segments can be combined, may be an empirical value or experimental value, and may be determined according to an environment at that time).

Step 5: Combine, in a case that the current event is a deletion event and there is a second segmented line segment in the segment set, the first dataset corresponding to the first segmented line segment into a first dataset corresponding to the second segmented line segment, to obtain a third dataset.

In other words, over-segmentation may exist in the foregoing step S204. Therefore, two over-segmented first datasets may be combined, and corresponding segmented line segments may also be combined into one segmented line segment.

Step 6: Determine the second datasets according to a plurality of obtained third datasets.

Optionally, the determining the second datasets according to a plurality of obtained third datasets includes: directly using the plurality of third datasets as a plurality of second datasets; or performing denoising processing on the plurality of third datasets to obtain second datasets. For example, denoising processing is respectively performed on each of the third datasets, and if there is still point cloud data in a third dataset on which denoising processing has been performed, the third dataset is used as a second dataset.

In the foregoing embodiment, denoising processing may be performed on each of the third datasets in the following manners:

First, if a quantity of pieces of point cloud data in a set is less than a specified threshold, there is a relatively high probability that the point cloud data included in the set belongs to noise rather than target objects. Therefore, in a possible implementation, a quantity of pieces of point cloud data in a third dataset may be obtained, and the third dataset is deleted in a case that the quantity of pieces of the point cloud data in the third dataset is less than a fourth threshold. A set in which a quantity of pieces of point cloud data is less than a minimum point threshold $N_{min}$ (that is, the fourth threshold) is removed. That is, a third dataset that may include point cloud data belonging to noise is removed.

Second, in some cases, a third dataset may be a ground point set obtained by scanning ground points instead of target objects. The ground point set brings trouble for subsequent classification, recognition, and tracing of obstacles (target objects). Therefore, in a possible implementation, a distance between a center of gravity of feature points represented by point cloud data in a third dataset and the laser sensor and a quantity of scanning lines of the point cloud data in the third dataset may be obtained. In a case that the distance between the center of gravity and the laser sensor is less than a fifth threshold and the quantity of the scanning lines is less than 2, the third dataset is deleted. That is, in case that a distance between a center of gravity of a dataset and an origin of the sensor is less than a specified distance threshold $D_{min}$ (that is, the fifth threshold), and a quantity of scanning lines is less than 2, the dataset may be considered as a ground point set and removed.

In an optional embodiment, the technical solutions of this application are described below in detail by using an example in which the technical solution of this application is applied to autonomous driving.

An autonomous vehicle or a self-piloting automobile is also referred to as a driverless automobile, a computer driving automobile, or a wheeled mobile robot, and is an intelligent automobile implementing driverless driving by using a computer system. The autonomous vehicle depends on cooperation of artificial intelligence, visual computing, a radar, a monitoring apparatus, and a global positioning system, to enable a computer to autonomously and safely operate a motor vehicle without any active operation of a human.

Figure 3:
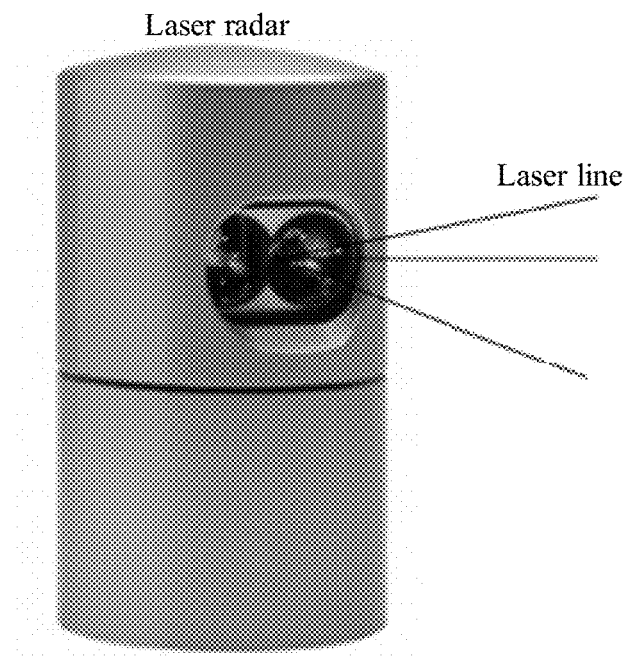
FIG. 3 is a schematic diagram of an optional laser radar according to an embodiment of this application.
Figure 4:
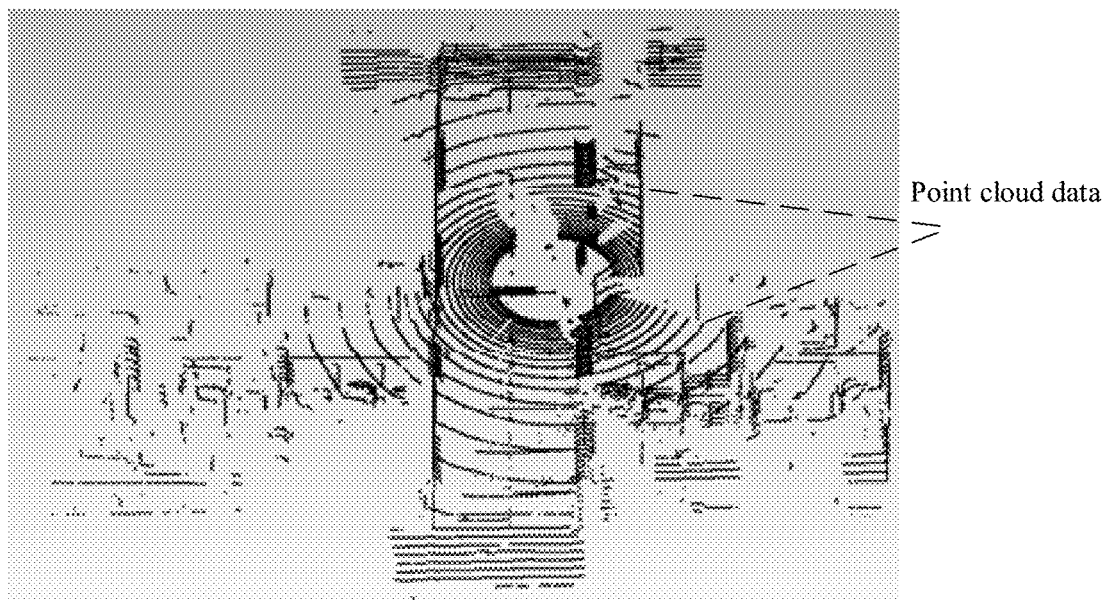
FIG. 4 is a schematic diagram of optional point cloud data according to an embodiment of this application.

In the recent years, with the rise of driverless technologies, a multi-line laser radar shown in FIG. 3 flourishes (a 64-line laser radar and a 32-line laser radar are typical representatives). Each black solid line in FIG. 3 represents a laser line. Compared with a single-line laser radar, the multi-line laser radar can scan a plurality of scanning lines once, can quickly obtain abundant three-dimensional information about the surrounding environment, and is very suitable for application to three-dimensional environment sensing of a driverless driving system. As shown in FIG. 4, each circle represents point cloud data obtained through scanning by a laser beam.

Figure 5:
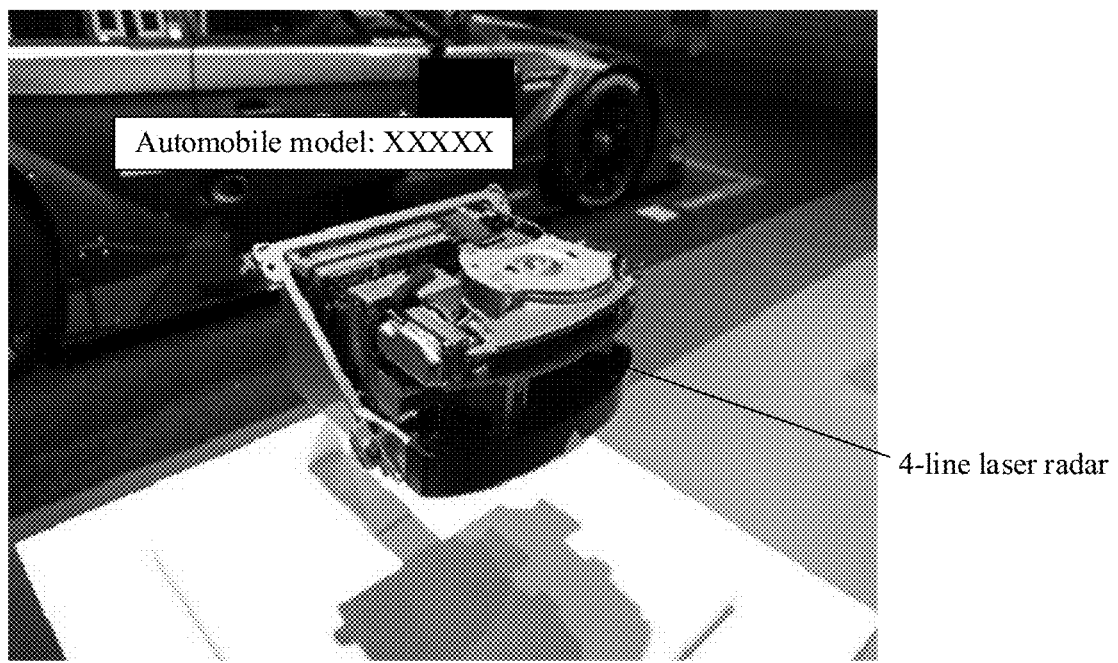
FIG. 5 is a schematic diagram of an optional scenario of a laser radar according to an embodiment of this application.

Considering objectives such as costs and convenience of application, development of a laser radar currently is directed at miniaturization and a low-line property. Especially with the setup of an ADAS application in the recent years, the low-line laser radar plays an increasing important role. A 4-line laser radar is adopted in a level-3 autonomous driving system of mounted on a vehicle, as shown in FIG. 5.

Because all single sensors have respective defects, a plurality of sensors usually need to be fused, to implement robust environment sensing. In a sensing system of a driverless vehicle, data of vision, millimeter waves, and the laser radar is usually fused. In this way, a better and safer decision can be made compared with an independent system. Inclement weather conditions or insufficient light are not conducive for functioning of a camera. However, the camera can distinguish colors (can recognize information such as a traffic light and a road sign), and has very high resolution. The laser radar can accurately measure distance information of surrounding obstacles, is not affected by ambient light, and can normally work at night.

There is a relatively large quantity of solutions for single-line laser point cloud data segmentation, but a relatively small quantity of solutions for low-line laser point cloud data segmentation. The low-line laser point cloud data segmentation may be implemented by using the following two technical solutions provided in this application: one is a segmentation method in which a single-line laser radar segmentation algorithm continues to be used and arranging is performed based on an order of points within a single laser scanning line; and the other is a method in which continuity of points is omitted, and 3D point cloud data is directly segmented.

The foregoing methods mainly have the following disadvantages: in the segmentation method based on a single scanning line, only a distance between adjacent points and a direction change are considered, over-segmentation is likely to be caused when a target is occluded, and under-segmentation is likely to be caused when target objects are excessively close to each other; in addition, combination of segments between different scanning lines requires a plurality of layers of circulation, and has relatively low efficiency; in the segmentation method directly based on 3D point cloud data, because merely using a distance between points as a similarity measure is considered, a problem that over-segmentation and under-segmentation are likely to occur also exists.

Figure 6:
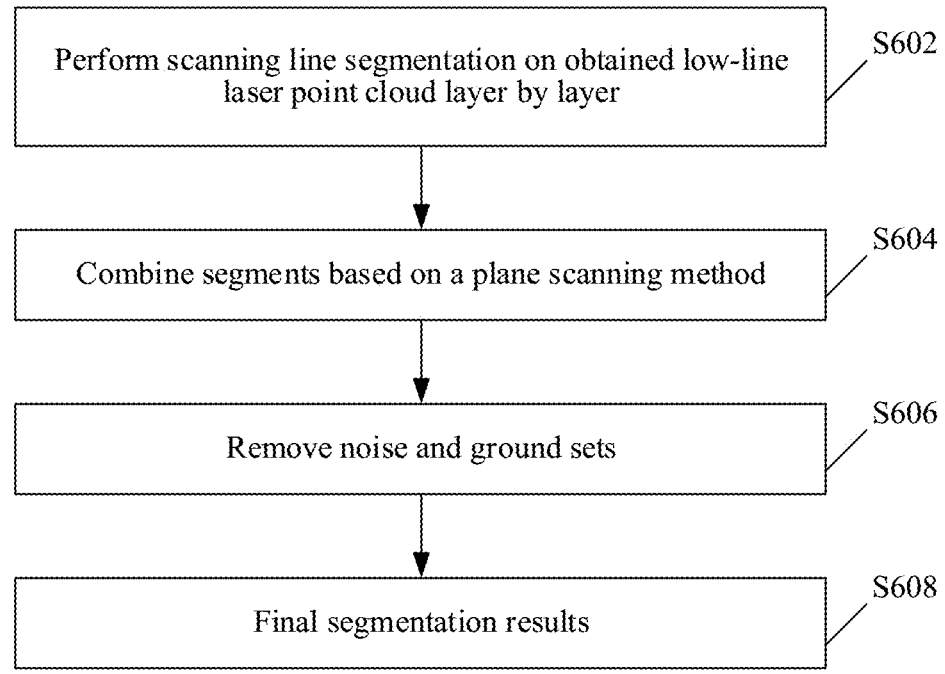
FIG. 6 is a flowchart of an optional method for segmenting point cloud data according to an embodiment of this application.

To overcome the foregoing problems, this application provides a method for quickly segmenting low-line laser point cloud. In the method, segments on scanning lines are first obtained based on segmentation methods of the scanning lines; then the segments of the scanning lines are combined by using a plane scanning method, to obtain candidate target cluster sets; and finally, feature extraction is performed on the candidate target cluster sets, and noise and ground sets are removed, to obtain final segmentation results. A basic process of the method for quickly segmenting low-line laser point cloud (that is, target point cloud data) is shown in FIG. 6 below by using an example in which the method is performed on an in-vehicle terminal.

Step S602: The in-vehicle terminal performs scanning line segmentation on obtained low-line laser point cloud layer by layer.

Figure 7:
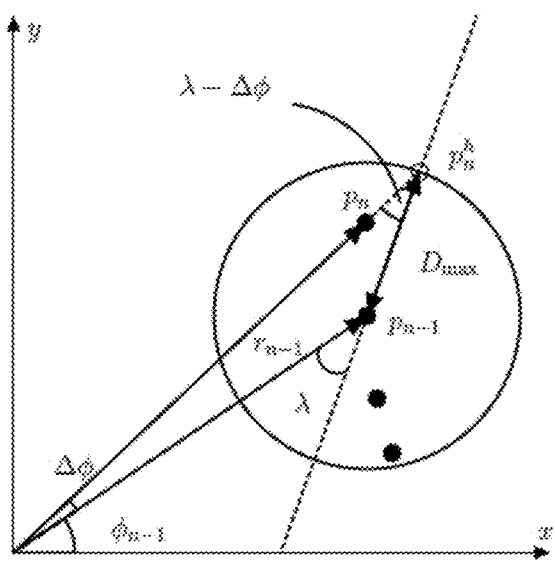
FIG. 7 is a schematic diagram of an optional adaptive distance threshold according to an embodiment of this application.

Referring to FIG. 7, considering a distance and angle continuity, a specific implementation process of a scanning line segmentation solution is as follows:

1) Initialize a segment set M to be empty, initialize lambda and Amax, and add a first point $P_1$ (equivalent to second point cloud data) to a first segment $S_1$ (equivalent to a first dataset).

2) Starting from a second point $P_2$, sequentially traverse each $P_1$ (equivalent to fourth point cloud data) on a scanning line; if $\|P_i - P_{i-1}\|$ (that is, a distance between third point cloud data and the fourth point cloud data $P_i$) is greater than $D_{max}$ (first threshold), and a value of an angle formed by 3 points including $P_{i-1}$, $P_i$, and $P_{i+1}$ (equivalent to fifth point cloud data) is less than $180 - A_{max}$ (equivalent to a second threshold), store a current segment $S_k$ into M, create a segment $S_{k+1}$ (equivalent to another first dataset), and insert a current point $P_1$ into $S_{k+1}$; otherwise, insert the current point $P_1$ into $S_k$.

3) After all points are traversed, if a current segment $S_n$ is not empty, insert the current segment $S_n$ into the set M.

Breaking and combination of segments of a scanning line: If the segments of the scanning line present a non-convex shape, breaking needs to be performed at a turning point; and if two segments conform to a case of being occluded by a foreground object to be segmented into two parts, the two segments may be combined.

Step S604: The in-vehicle terminal combines the segments based on a plane scanning method.

The plane scanning method is a basic algorithm in calculation geometry, and it is used for calculating an intersection point of several line segments on a plane. Herein, the plane scanning method is improved, to implement combination of the segments of the scanning lines. A specific algorithm process is as follows:

1) Define an event as a starting or ending endpoint of a segment, the starting endpoint corresponding to an insertion event of a current segment, and the ending endpoint corresponding to a deletion event corresponding to the current segment; define an event queue Q (equivalent to an event set) as an ordered set of all events; and define a current segment set S.

2) Initialize the event queue Q and the current segment set S (equivalent to a segment set) to be empty, insert all endpoints of the segments of the scanning lines into the event queue Q, and sorting the endpoints in ascending order by value.

3) Sequentially traverse each event in the event queue Q; if the event is an insertion event, insert a segment (first segmented line segment) corresponding to the event into the current segment set S; if the event is a deletion event, first calculate a distance between a segment corresponding to the event and another segment in the current segment set S, and if the distance is less than a specified threshold $D_{thred}$ (equivalent to a third threshold), indicating that the there is a second segmented line segment, then combine the current segment set into a nearest segment set; otherwise, output the current segment set; and finally, delete the segment corresponding to the event from the current segment set S.

A method for calculating a distance between segments may be calculating an average distance within an overlapping region between two segments.

Step S606: The in-vehicle terminal removes noise and ground sets.

1) Noise point cloud set removal: A set in which a quantity of pieces of point cloud data is less than a minimum point threshold Nmin (equivalent to a fourth threshold) is removed. Because if the quantity of pieces of the point cloud data is less than a specified threshold, it indicates that there is a relatively high probability that a dataset including the point cloud data belongs to noise. In addition, related features cannot be calculated when a quantity of pieces of point cloud data is excessively small.

2) Ground point cloud set removal: For a point cloud set of which a distance between a center of gravity of the point cloud set and an origin of a sensor is less than a specified distance threshold $D_{min}$ (equivalent to a fifth threshold), and a quantity of scanning lines is less than 2, the point cloud set may be considered as a ground point set and removed.

FIG. 7 is a schematic diagram of calculating an adaptive distance threshold:

$$\|p_n^h - p_n\| = \gamma_{n-1} \frac{\sin(\Delta\emptyset)}{\sin(\lambda - \Delta\emptyset)}$$

$$D_{max} = \|p_n^h - p_n\| + 3\sigma_r$$

where $\emptyset_{n-1}$ is an angle between point cloud data $P_{n-1}$ and an X axis, $\emptyset_n$ is an angle between point cloud data $P_n$ and the X axis, ΔØ is a difference between $Ø_n$ and $Ø_{n-1}$, $D_{max}$ represents a radius with $P_{n-1}$ as a circle center, $P_n^h$ represents an intersection point between a line passing through an origin and $P_n$ and a circumference, $r_{n-1}$ represents a segment from the origin to $P_{n-1}$, λ represents an angle between a line passing through the origin and $P_{n-1}$ and a line passing through $P_n^h$ and $P_{n-1}$, and $σ_r$ is a preset parameter and may be an empirical value or an experimental value.

Figure 8:
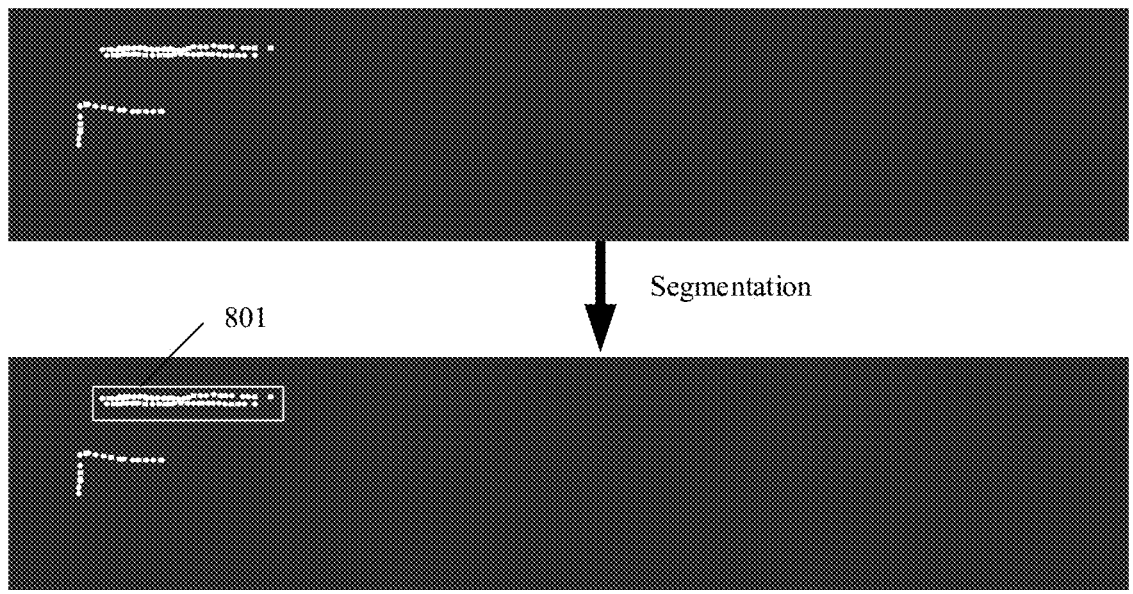
FIG. 8 is a schematic diagram of optional segmentation of point cloud data according to an embodiment of this application.

Based on the foregoing steps, quick segmentation of low-line laser point cloud can be implemented, to obtain final segmentation results, as shown in 801 in FIG. 8. Point cloud data belonging to different target objects in the segmentation results may be marked by using different colors, or may be marked by using marking boxes in different shapes. In 801, point cloud data belonging to one target object (for example, a railing) is marked by using a rectangular box.

The following problems exist in the related art: in the segmentation method based on a single scanning line, only a distance between adjacent points and a direction change are considered, over-segmentation is likely to be caused when a target object is occluded, and under-segmentation is likely to be caused when target objects are excessively close to each other; in addition, combination of segmented line segments between different scanning lines requires a plurality of layers of circulation, and has relatively low efficiency; in the segmentation method directly based on 3D point cloud data, because merely using a distance between points as a similarity measure is considered, a problem that over-segmentation and under-segmentation are likely to occur also exists. For the problems existing in the related art, a method for quickly segmenting low-line laser point cloud is provided in the solution of this application. In the method, segments on scanning lines are first obtained based on segmentation methods of the scanning lines; then the segments of the scanning lines are combined by using a plane scanning method, to obtain candidate target cluster sets; and finally, feature extraction is performed on the candidate target cluster sets, and noise and ground sets are removed, to obtain final segmentation results.

With mass production of low-line laser radars, accurate segmentation of point cloud data based on a low-line laser is a basic premise for implementing obstacle detection and tracing, and has great significance in sensing technologies for driverless driving. The quick segmentation method based on low-line laser point cloud data provided in this application not only reduces algorithm complexity, but also helps reduce over-segmentation and under-segmentation phenomena occurring in a segmentation process, thereby improving sensing robustness of autonomous driving.

To make the description simple, the foregoing method embodiments are stated as a series of action combinations. However, a person skilled in the art needs to learn that this application is not limited to the described sequence of the actions because according to this application, some steps may use another sequence or may be simultaneously performed. In addition, it is to be understood by a person skilled in the art that the embodiments described in the specification are all exemplary embodiments and the related actions and modules are not mandatory to this application.

According to the foregoing descriptions of implementations, a person skilled in the art may clearly learn that the method according to the foregoing embodiments may be implemented by using software and a necessary general hardware platform, or certainly may be implemented by using hardware. However, in most cases, the former is a better implementation. Based on such an understanding, the technical solutions in this application essentially or the part contributing on the related art may be implemented in the form of a software product. The computer software product is stored in a storage medium (such as a read-only memory (ROM)/random access memory (RAM), a magnetic disk, or an optical disc), and includes several instructions for instructing a terminal device (which may be a mobile phone, a computer, a server, a network device, and the like) to perform the method described in the embodiments of this application.

Figure 9:
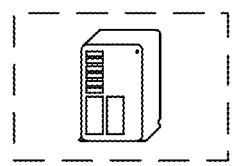
FIG. 9 is a schematic diagram of an optional apparatus for segmenting point cloud data according to an embodiment of this application.
Figure 9:
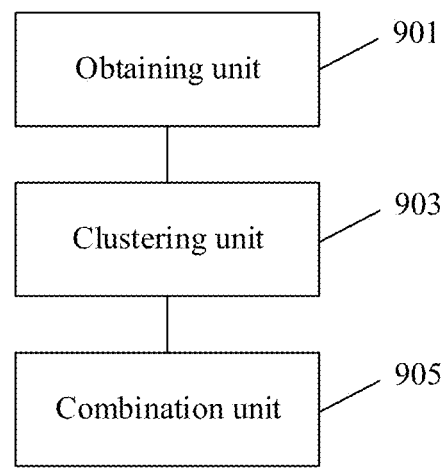

According to another aspect of the embodiments of this application, an apparatus for segmenting point cloud data for implementing the foregoing method for segmenting point cloud data is further provided. FIG. 9 is a schematic diagram of an optional apparatus for segmenting point cloud data according to an embodiment of this application. As shown in FIG. 9, the apparatus may include:

an obtaining unit 901, configured to obtain target point cloud data, the target point cloud data being data obtained by scanning target objects around a vehicle with laser lines.

In an implementation, the target point cloud data may be data obtained through scanning by a plurality of laser lines of a laser radar. The laser radar may measure a size, a shape, and the like of an object by using a scanning technology. In the laser radar, a rotation motor having good stability and high precision may be used. When a laser line is cast to and reflected by a polygon driven by the motor, to form scanning beams, because the polygon is located on a front focal plane of a scanning lens, and uniformly rotates to enable an incident angle of the laser line to continuously vary relative to a reflector, a reflection angle also continuously varies. Parallel scanning lines from top to bottom in a consecutive manner are formed through a function of the scanning lens, to form scanning line data, that is, a point cloud sequence formed through one time of scanning by a single-line laser.

The laser radar in this application may be a low-line laser radar or a multi-line laser radar. The low-line laser radar may generate a relatively small quantity of scanning lines by performing scanning once, generally includes 4 lines or 8 lines, and is mainly a 2.5D laser radar with a vertical field of view not greater than 10°. The multi-line laser radar (or referred to as a 3D laser radar) may generate a plurality of scanning lines by performing scanning once, and generally includes 16 lines, 32 lines, 64 lines, or the like. A largest difference between the 3D laser radar and the 2.5D laser radar lies in vertical fields of view of the laser radars. A vertical field of view of the 3D laser radar may reach 30° or even 40° or above.

In an advanced driver assistance system (ADAS), an active safety technology of collecting environment data inside and outside a vehicle in time by using various sensors mounted on the vehicle need to perform technical processing such as recognition, detection, and tracing of static and dynamic objects is needed, to enable a driver to be aware of a possible danger in a shortest time, thereby drawing attention and improving safety. The sensors used in the ADAS mainly include a camera, a laser radar, and the like, and when the vehicle detects a potential danger, the sensors give an alarm to remind the driver to notice an abnormal vehicle or road conditions. In this case, the target objects may be static and dynamic objects and the like outside the vehicle, and are objects used for determining existence of a potential danger and assisting in driving logic determining, for example, a building, a pedestrian, another vehicle, an animal, and traffic lights.

The apparatus may further include: a clustering unit 903, configured to cluster the target point cloud data to obtain a plurality of first datasets, feature points represented by point cloud data included in each of the first datasets being fitted on one segmented line segment, the feature point being a point on the target object; and a combination unit 905, configured to combine the plurality of first datasets according to distances between the plurality of segmented line segments to obtain second datasets, the second dataset including at least one of the first datasets.

The obtaining unit 901 in this embodiment may be configured to perform step S202 in the embodiments of this application, the clustering unit 903 in this embodiment may be configured to perform step S204 in the embodiments of this application, and the combination unit 905 in this embodiment may be configured to perform step S206 in the embodiments of this application.

Implemented examples and application scenarios of the foregoing modules are the same as those of the corresponding steps, but are not limited to the content disclosed in the foregoing embodiments. The foregoing modules may be run in the hardware environment shown in FIG. 1 as a part of the apparatus, and may be implemented by software, or may be implemented by hardware.

By analyzing the related art, the applicant learns that most point cloud segmentation methods in the related art are to process a disordered and discrete point cloud. In the point cloud segmentation methods, a clustering segmentation method may be used for space point cloud segmentation because the method has low complexity and is easy to implement. However, because of existence of a ground point cloud in a large outdoor scene, it is difficult to segment the ground and non-ground objects effectively by using the clustering method.

In an optional embodiment, for non-ground point cloud clustering segmentation, a clustering segmentation method based on a radius with a fixed threshold may be used, and selection of the threshold has large impact on a segmentation result. If a selected threshold is excessively large, small objects having a relatively short spacing distance may not be separated (that is, under-segmentation occurs); and if a selected threshold is excessively small, an object having a relatively long spacing distance (for example, a building) may be segmented into a plurality of clusters (that is, over-segmentation occurs).

In this embodiment of this application, the segmented line segments (which may be referred to as segments for short) on scanning lines are first obtained based on segmentation methods of the scanning lines, and each of the segmented line segments corresponds to one first dataset, so that object contours may be preliminarily segmented; and then the segments of the scanning lines are combined by using a plane scanning method, to obtain candidate target cluster sets (that is, the second datasets). The above is equivalent to combining contour lines belonging to the same object. Because the point cloud data only needs to be traversed once, a problem that when merely clustering segmentation is used, efficiency is low and ground and non-ground objects are difficult to effectively segment can be resolved. In the solution of this application, merely distances between segmented line segments need to be determined, so that compared with distances between point clouds, there is no contingency factor (due to a viewing angle factor, some point clouds overlap in a plane dimension but do not actually overlap in space) for determining distances between point clouds. In addition, a problem of under-segmentation or over-segmentation occurring during segmentation directly performed on a point cloud by using the clustering segmentation method based on a radius of a fixed threshold can be avoided. It can be learned that, the technical solution of this application not only reduces algorithm complexity, but also helps reduce under-segmentation and over-segmentation phenomena occurring in a segmentation process, thereby improving sensing robustness of autonomous driving.

By using the foregoing units, target point cloud data is obtained, the target point cloud data being data obtained by scanning target objects around a vehicle with laser lines; the target point cloud data is clustered to obtain a plurality of first datasets, feature points represented by point cloud data included in each of the first datasets being fitted on one segmented line segment, the feature point being a point on the target object; and the plurality of first datasets are combined according to distances between a plurality of segmented line segments to obtain second datasets, the second dataset including at least one of the first datasets. During segmentation, the "clustering the target point cloud data to obtain a plurality of first datasets" is equivalent to completing point cloud data segmentation by merely traversing all point cloud data once instead of completing segmentation by traversing point cloud data a plurality of times in the related art, so that a technical problem of relatively low efficiency of point cloud segmentation in the related art can be resolved, to further achieve a technical effect of improving segmentation efficiency.

Optionally, the foregoing clustering unit may include: a search module, configured to search the target point cloud data for a plurality of pieces of first point cloud data, feature points represented by the plurality of pieces of first point cloud data being adjacent; and a first storage module, configured to store the plurality of pieces of first point cloud data into one created first dataset.

The search module may further be configured to use point cloud data that is in the target point cloud data and that represents features points having a distance not greater than a first threshold and an angle formed not less than a second threshold as the plurality of pieces of first point cloud data.

Optionally, the search module may include: an obtaining submodule, configured to obtain second point cloud data in the target point cloud data, the second point cloud data being point cloud data that is in the target point cloud data and that is not clustered into any one of the first datasets; and a search submodule, configured to use, in a case that a distance between a feature point represented by third point cloud data and a feature point represented by fourth point cloud data is greater than the first threshold, and an angle formed by the feature point represented by the third point cloud data, the feature point represented by the fourth point cloud data, and a feature point represented by fifth point cloud data is less than a second threshold, the second point cloud data, the third point cloud data, and point cloud data whose collection time is between an collection time of the second point cloud data and an collection time of the third point cloud data as the plurality of pieces of first point cloud data, the third point cloud data being point cloud data that is in the target point cloud data and that is not clustered into any one of the first datasets, the collection time of the third point cloud data being later than the collection time of the second point cloud data, the third point cloud data and the fourth point cloud data being point cloud data whose collection times are adjacent, an collection time of the fourth point cloud data being later than the collection time of the third point cloud data, and the fourth point cloud data and the fifth point cloud data being point cloud data whose collection times are adjacent, an collection time of the fifth point cloud data being later than the collection time of the fourth point cloud data.

Optionally, the clustering unit may further include: a second storage module, configured to store, in a case that the distance between the feature point represented by the third point cloud data and the feature point represented by the fourth point cloud data is greater than the first threshold, and the angle formed by the feature point represented by the third point cloud data, the feature point represented by the fourth point cloud data, and the feature point represented by the fifth point cloud data is less than the second threshold, the fourth point cloud data into another first dataset different from the first dataset used for storing the third point cloud data.

The foregoing combination unit may further be configured to combine first datasets that are in the plurality of first datasets and that have distances between segmented line segments obtained through fitting less than a third threshold, to obtain the second datasets.

Optionally, the combination unit may include: a creation module, configured to create an event set, the event set storing events of the plurality of segmented line segments corresponding to the plurality of first datasets according to a collection time of point cloud data in the plurality of first datasets, the events of the segmented line segments including insertion events corresponding to initial feature points of the segmented line segments and deletion events corresponding to ending feature points of the segmented line segments; a combination module, configured to traverse each event in the event set, and store, in a case that a current traversed event is an insertion event, a first segmented line segment in the plurality of segmented line segments that corresponds to the current event into a segment set; use a first dataset corresponding to the first segmented line segment as a third dataset in a case that the current event is a deletion event and there is no second segmented line segment in the segment set; and combine, in a case that the current event is a deletion event and there is a second segmented line segment in the segment set, the first dataset corresponding to the first segmented line segment into a first dataset corresponding to the second segmented line segment, to obtain a third dataset, the second segmented line segment being a segmented line segment in the segment set that has a distance to the first segmented line segment less than the third threshold; and a determining module, configured to determine the second datasets according to a plurality of obtained third datasets.

Optionally, the foregoing determining module may further be configured to: use the plurality of third datasets as second datasets; and perform denoising processing on the plurality of third datasets to obtain second datasets.

The foregoing determining module may further be configured to: obtain a quantity of pieces of point cloud data in a third dataset, and in a case that the quantity of pieces of the point cloud data in the third dataset is less than a fourth threshold, delete the third dataset; obtain a distance between a center of gravity of feature points represented by the point cloud data in the third dataset and a laser sensor, and a quantity of scanning lines of the point cloud data in the third dataset, and in a case that the distance is less than a fifth threshold and the quantity of the scanning lines is less than 2, delete the third dataset.

Optionally, the obtaining unit may further be configured to: obtain the target point cloud data through scanning the target objects by using the laser sensor mounted on the vehicle, the vehicle having an autonomous driving system.

The following problems exist in the related art: in the segmentation method based on a single scanning line, only a distance between adjacent points and a direction change are considered, over-segmentation is likely to be caused when a target object is occluded, and under-segmentation is likely to be caused when target objects are excessively close to each other; in addition, combination of segmented line segments between different scanning lines requires a plurality of layers of circulation, and has relatively low efficiency; in the segmentation method directly based on 3D point cloud data, because merely using a distance between points as a similarity measure is considered, a problem that over-segmentation and under-segmentation are likely to occur also exists. For the problems existing in the related art, a method for quickly segmenting low-line laser point cloud is provided in the solution of this application. In the method, segments on scanning lines are first obtained based on segmentation methods of the scanning lines; then the segments of the scanning lines are combined by using a plane scanning method, to obtain candidate target cluster sets; and finally, feature extraction is performed on the candidate target cluster sets, and noise and ground sets are removed, to obtain final segmentation results.

With mass production of low-line laser radars, accurate segmentation of point cloud data based on a low-line laser is a basic premise for implementing obstacle detection and tracing, and has great significance in sensing technologies for driverless driving. The quick segmentation method based on low-line laser point cloud data provided in this application not only reduces algorithm complexity, but also helps reduce over-segmentation and under-segmentation phenomena occurring in a segmentation process, thereby improving sensing robustness of autonomous driving.

Implemented examples and application scenarios of the foregoing modules are the same as those of the corresponding steps, but are not limited to the content disclosed in the foregoing embodiments. The foregoing modules may be run in the hardware environment shown in FIG. 1 as a part of the apparatus, and may be implemented by software, or may be implemented by hardware. The hardware environment includes a network environment.

According to another aspect of the embodiments of this application, a server or a terminal for implementing the foregoing method for segmenting point cloud data is further provided.

Figure 10:
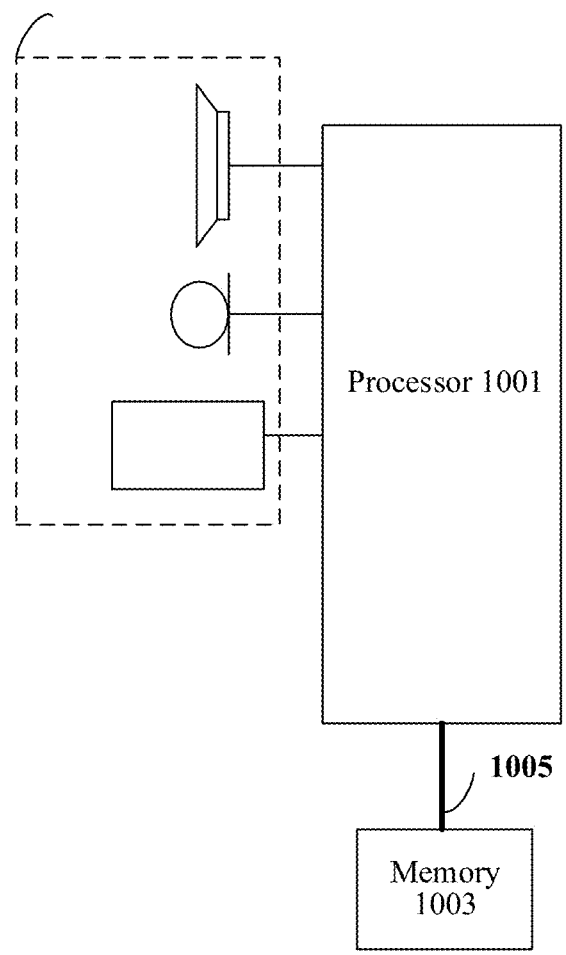
FIG. 10 is structural block diagram of a terminal according to an embodiment of this application.

FIG. 10 is a structural block diagram of the terminal according to this embodiment of this application. As shown in FIG. 10, the terminal may include one or more processors 1001 (only one processor is shown in FIG. 10), a memory 1003, and a transmission apparatus 1005. As shown in FIG. 10, the terminal may further include an input/output device 1007.

The memory 1003 may be configured to store a software program and module, for example, a program instruction/module corresponding to the method and apparatus for segmenting point cloud data in the embodiments of this application. The processor 1001 runs the software program and module stored in the memory 1003, to implement various functional applications and data processing, that is, implement the foregoing method for segmenting point cloud data. The memory 1003 may include a high-speed random access memory, and may further include a non-volatile memory, for example, one or more magnetic storage apparatuses, a flash memory, or another non-volatile solid-state memory. In some embodiments, the memory 1003 may further include memories remotely disposed relative to the processor 1001, and the remote memories may be connected to a terminal by using a network. An example of the network includes, but is not limited to, the Internet, an intranet, a local area network, a mobile communication network and a combination thereof.

The transmission apparatus 1005 is configured to receive or send data by using a network, or may further be configured to transmit data between the processor and the memory. A specific example of the foregoing network may include a wired network and a wireless network. In an example, the transmission apparatus 1005 includes a network interface controller (NIC). The NIC may be connected to another network device and a router by using a network cable, so as to communicate with the Internet or a local area network. In an example, the transmission apparatus 1005 is a radio frequency (RF) module, which communicates with the Internet in a wireless manner.

Specifically, the memory 1003 is configured to store an application program.

The processor 1001 may invoke, by using the transmission apparatus 1005, the application program stored in the memory 1003, to perform the following steps:

obtaining target point cloud data, the target point cloud data being data obtained by scanning target objects around a vehicle with laser lines;

clustering the target point cloud data to obtain a plurality of first datasets, feature points represented by point cloud data included in each of the first datasets being fitted on one segmented line segment, the feature point being a point on the target object; and combining the plurality of first datasets according to distances between the plurality of segmented line segments to obtain second datasets, the second dataset including at least one of the first datasets.

By using this embodiment of this application, target point cloud data is obtained, the target point cloud data being data obtained by scanning target objects around a vehicle with laser lines; the target point cloud data is clustered to obtain a plurality of first datasets, feature points represented by point cloud data included in each of the first datasets being fitted on one segmented line segment, the feature point being a point on the target object; and the plurality of first datasets are combined according to distances between a plurality of segmented line segments to obtain second datasets, the second dataset including at least one of the first datasets. During segmentation, the "clustering the target point cloud data to obtain a plurality of first datasets" is equivalent to completing point cloud data segmentation by merely traversing all point cloud data once instead of completing segmentation by traversing point cloud data a plurality of times in the related art, so that a technical problem of relatively low efficiency of point cloud segmentation in the related art can be resolved, to further achieve a technical effect of improving segmentation efficiency.

Optionally, for a specific example in this embodiment, reference may be made to the example described in the foregoing embodiment, and details are not described herein again in this embodiment.

A person of ordinary skill in the art may understand that, the structure shown in FIG. 10 is only exemplary. The terminal may be a terminal device such as a smartphone (such as an Android mobile phone or an iOS mobile phone), a tablet computer, a palmtop computer, a mobile Internet device (MID), or a PAD. FIG. 10 does not constitute a limitation on a structure of the foregoing electronic device. For example, the terminal may further include more or fewer components (such as a network interface and a display apparatus) than those shown in FIG. 10, or may have a configuration different from that shown in FIG. 10.

A person of ordinary skill in the art may understand that all or some of the steps of the methods in the foregoing embodiments may be implemented by a program instructing relevant hardware of the terminal device. The program may be stored in a non-transitory computer-readable storage medium. The storage medium may include a flash disk, a read-only memory (ROM), a random access memory (RAM), a magnetic disk, an optical disc, and the like.

An embodiment of this application further provides a non-transitory computer-readable storage medium. Optionally, in this embodiment, the storage medium may be configured to store program code for performing the method for segmenting point cloud data.

Optionally, in this embodiment, the storage medium may be located on at least one of a plurality of network devices in the network described in the foregoing embodiment.

Optionally, in this embodiment, the storage medium is configured to store program code for performing the following steps:

S12: Obtain target point cloud data, the target point cloud data being data obtained by scanning target objects around a vehicle with laser lines.

S14: Cluster the target point cloud data to obtain a plurality of first datasets, feature points represented by point cloud data included in each of the first datasets being fitted on one segmented line segment, the feature point being a point on the target object.

S16: Combine the plurality of first datasets according to distances between the plurality of segmented line segments to obtain second datasets, the second dataset including at least one of the first datasets.

Optionally, for a specific example in this embodiment, reference may be made to the example described in the foregoing embodiment, and details are not described herein again in this embodiment.

Optionally, in this embodiment, the storage medium may include, but is not limited to, various media such as a USB flash drive, a ROM, a RAM, a removable hard disk, a magnetic disk, and an optical disc that can store the program code.

The sequence numbers of the foregoing embodiments of this application are merely for description purpose and do not indicate the preference of the embodiments.

When the integrated unit in the foregoing embodiments is implemented in the form of a software functional unit and sold or used as an independent product, the integrated unit may be stored in the foregoing non-transitory computer-readable storage medium. Based on such an understanding, the technical solution of this application essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, descriptions of the embodiments have different emphases. As for parts that are not described in detail in one embodiment, reference can be made to the relevant descriptions of the other embodiments.

In the several embodiments provided in this application, it is to be understood that the disclosed client can be implemented in other manners. The apparatus embodiments described above are merely exemplary. For example, the segmentation of the units is merely the segmentation of logic functions, and may be another segmentation in an actual implementation. For example, a plurality of units or components may be combined, or may be integrated into another system, or some features may be omitted or not performed. In addition, the displayed or discussed mutual couplings or direct couplings or communication connections may be implemented by using some interfaces. The indirect couplings or communication connections between the units or modules may be implemented in electronic or other forms.

The units described as separate parts may or may not be physically separate. Parts displayed as units may or may not be physical units, and may be located in one position, or may be distributed on a plurality of network units. Some or all of the units may be selected according to actual requirements to achieve the objectives of the solutions in the embodiments.

In addition, functional units in the embodiments of this application may be integrated into one processing unit, or each of the units may exist alone physically, or two or more units are integrated into one unit. The foregoing integrated unit may be implemented in the form of hardware, or may be implemented in the form of a software function unit.

The foregoing descriptions are merely exemplary implementations of this application. A person of ordinary skill in the art may further make several improvements and refinements without departing from the principle of this application, and the improvements and refinements shall fall within the protection scope of this application.

What is claimed is:

1. A method for segmenting point cloud data performed at a computing device having a processor and memory storing a plurality of computer programs to be executed by the processor, the method comprising:
    obtaining target point cloud data by scanning target objects around a vehicle with laser lines;
    clustering the target point cloud data to obtain a plurality of first datasets;
    for each dataset of the plurality of first datasets, fitting feature points represented by point cloud data within the dataset on one segmented line segment, wherein each of the feature points is a respective point on a respective target object; and
    combining the plurality of first datasets according to distances between the corresponding plurality of segmented line segments to obtain a plurality of second datasets, wherein each dataset of the plurality of second datasets includes at least one dataset from the plurality of first datasets.

2. The method according to claim 1, wherein the clustering the target point cloud data to obtain a plurality of first datasets comprises creating each of the plurality of first datasets by:
    searching the target point cloud data for a plurality of pieces of first point cloud data, wherein feature points represented by the plurality of pieces of first point cloud data are adjacent to one another; and
    storing the plurality of pieces of first point cloud data into one created first dataset.

3. The method according to claim 2, wherein the searching the target point cloud data for a plurality of pieces of first point cloud data comprises:
    selecting point cloud data in the target point cloud data that represents features points whose relative distance is not greater than a first threshold and whose formed angle is not less than a second threshold as the plurality of pieces of first point cloud data.

4. The method according to claim 3, wherein the selecting point cloud data in the target point cloud data that represents features points whose relative distance is not greater than a first threshold and whose formed angle is not less than a second threshold as the plurality of pieces of first point cloud data comprises:
    obtaining second point cloud data in the target point cloud data, wherein the second point cloud data is point cloud data in the target point cloud data that is not clustered into any one of the plurality of first datasets; and
    selecting the second point cloud data, third point cloud data, and point cloud data whose collection time is between an collection time of the second point cloud data and an collection time of the third point cloud data as the plurality of pieces of first point cloud data, when a distance between a feature point represented by the third point cloud data and a feature point represented by fourth point cloud data is greater than the first threshold, and an angle formed by the feature point represented by the third point cloud data, the feature point represented by the fourth point cloud data, and a feature point represented by fifth point cloud data is less than the second threshold, the third point cloud data being point cloud data that is in the target point cloud data and that is not clustered into any one of the first datasets, the collection time of the third point cloud data being later than the collection time of the second point cloud data, the third point cloud data and the fourth point cloud data being point cloud data whose collection times are adjacent, an collection time of the fourth point cloud data being later than the collection time of the third point cloud data, and the fourth point cloud data and the fifth point cloud data being point cloud data whose collection times are adjacent, an collection time of the fifth point cloud data being later than the collection time of the fourth point cloud data.

5. The method according to claim 4, further comprising:
    storing the fourth point cloud data into another first dataset different from the first dataset used for storing the third point cloud data when the distance between the feature point represented by the third point cloud data and the feature point represented by the fourth point cloud data is greater than the first threshold, and the angle formed by the feature point represented by the third point cloud data, the feature point represented by the fourth point cloud data, and the feature point represented by the fifth point cloud data is less than the second threshold.

6. The method according to claim 1, wherein the combining the plurality of first datasets according to distances between the corresponding plurality of segmented line segments to obtain a plurality of second datasets comprises:
    combining a subset of the plurality of first datasets whose associated distances between their corresponding segmented line segments obtained through fitting less than a third threshold, to obtain a respective one of the plurality of second datasets.

7. The method according to claim 6, wherein the combining a subset of the plurality of first datasets whose associated distances between their corresponding segmented line segments obtained through fitting less than a third threshold, to obtain a respective one of the plurality of second datasets comprises:
    creating an event set, the event set storing events of the plurality of segmented line segments corresponding to the plurality of first datasets according to a collection time of point cloud data in the plurality of first datasets, the events of the segmented line segments comprising insertion events corresponding to initial feature points of the segmented line segments and deletion events corresponding to ending feature points of the segmented line segments;

traversing each event in the event set, and storing, in a case that a current traversed event is an insertion event, a first segmented line segment in the plurality of segmented line segments that corresponds to the current event into a segment set; using a first dataset corresponding to the first segmented line segment as a third dataset in a case that the current event is a deletion event and there is no second segmented line segment in the segment set; and combining, in a case that the current event is a deletion event and there is a second segmented line segment in the segment set, the first dataset corresponding to the first segmented line segment into a first dataset corresponding to the second segmented line segment, to obtain a third dataset, the second segmented line segment being a segmented line segment in the segment set that has a distance to the first segmented line segment less than the third threshold; and determining the second datasets according to a plurality of obtained third datasets.

8. The method according to claim 7, wherein the determining the second dataset according to a plurality of obtained third datasets comprises:

using the plurality of third datasets as the second datasets; or performing denoising processing on the plurality of third datasets, to obtain the second datasets.

9. The method according to claim 8, wherein the performing denoising processing on the plurality of third datasets comprises:

obtaining a quantity of pieces of point cloud data in the third dataset and deleting the third dataset in a case that the quantity of pieces of the point cloud data in the third dataset is less than a fourth threshold; or obtaining a distance between a center of gravity of feature points represented by the point cloud data in the third dataset and a laser sensor, and a quantity of scanning lines of the point cloud data in the third dataset and deleting the third dataset in a case that the distance is less than a fifth threshold and the quantity of the scanning lines is less than 2.

10. A computing device, comprising:

memory;

a processor; and a plurality of computer programs stored on the memory that, when executed by the processor, cause the computing device to perform a plurality of operations including:

obtaining target point cloud data by scanning target objects around a vehicle with laser lines;

clustering the target point cloud data to obtain a plurality of first datasets;

for each dataset of the plurality of first datasets, fitting feature points represented by point cloud data within the dataset on one segmented line segment, wherein each of the feature points is a respective point on a respective target object; and combining the plurality of first datasets according to distances between the corresponding plurality of segmented line segments to obtain a plurality of second datasets, wherein each dataset of the plurality of second datasets includes at least one dataset from the plurality of first datasets.

11. The computing device according to claim 10, wherein the clustering the target point cloud data to obtain a plurality of first datasets comprises creating each of the plurality of first datasets by:

searching the target point cloud data for a plurality of pieces of first point cloud data, wherein feature points represented by the plurality of pieces of first point cloud data are adjacent to one another; and storing the plurality of pieces of first point cloud data into one created first dataset.

12. The computing device according to claim 11, wherein the searching the target point cloud data for a plurality of pieces of first point cloud data comprises:

selecting point cloud data in the target point cloud data that represents features points whose relative distance is not greater than a first threshold and whose formed angle is not less than a second threshold as the plurality of pieces of first point cloud data.

13. The computing device according to claim 12, wherein the selecting point cloud data in the target point cloud data that represents features points whose relative distance is not greater than a first threshold and whose formed angle is not less than a second threshold as the plurality of pieces of first point cloud data comprises:

obtaining second point cloud data in the target point cloud data, wherein the second point cloud data is point cloud data in the target point cloud data that is not clustered into any one of the plurality of first datasets; and selecting the second point cloud data, third point cloud data, and point cloud data whose collection time is between an collection time of the second point cloud data and an collection time of the third point cloud data as the plurality of pieces of first point cloud data, when a distance between a feature point represented by the third point cloud data and a feature point represented by fourth point cloud data is greater than the first threshold, and an angle formed by the feature point represented by the third point cloud data, the feature point represented by the fourth point cloud data, and a feature point represented by fifth point cloud data is less than the second threshold, the third point cloud data being point cloud data that is in the target point cloud data and that is not clustered into any one of the first datasets, the collection time of the third point cloud data being later than the collection time of the second point cloud data, the third point cloud data and the fourth point cloud data being point cloud data whose collection times are adjacent, an collection time of the fourth point cloud data being later than the collection time of the third point cloud data, and the fourth point cloud data and the fifth point cloud data being point cloud data whose collection times are adjacent, an collection time of the fifth point cloud data being later than the collection time of the fourth point cloud data.

14. The computing device according to claim 13, wherein the plurality of operations further comprise:

storing the fourth point cloud data into another first dataset different from the first dataset used for storing the third point cloud data when the distance between the feature point represented by the third point cloud data and the feature point represented by the fourth point cloud data is greater than the first threshold, and the angle formed by the feature point represented by the third point cloud data, the feature point represented by the fourth point cloud data, and the feature point represented by the fifth point cloud data is less than the second threshold.

15. The computing device according to claim 10, wherein the combining the plurality of first datasets according to distances between the corresponding plurality of segmented line segments to obtain a plurality of second datasets comprises:
  combining a subset of the plurality of first datasets whose associated distances between their corresponding segmented line segments obtained through fitting less than a third threshold, to obtain a respective one of the plurality of second datasets.

16. The computing device according to claim 15, wherein the combining a subset of the plurality of first datasets whose associated distances between their corresponding segmented line segments obtained through fitting less than a third threshold, to obtain a respective one of the plurality of second datasets comprises:
  creating an event set, the event set storing events of the plurality of segmented line segments corresponding to the plurality of first datasets according to a collection time of point cloud data in the plurality of first datasets, the events of the segmented line segments comprising insertion events corresponding to initial feature points of the segmented line segments and deletion events corresponding to ending feature points of the segmented line segments;
  traversing each event in the event set, and storing, in a case that a current traversed event is an insertion event, a first segmented line segment in the plurality of segmented line segments that corresponds to the current event into a segment set; using a first dataset corresponding to the first segmented line segment as a third dataset in a case that the current event is a deletion event and there is no second segmented line segment in the segment set; and combining, in a case that the current event is a deletion event and there is a second segmented line segment in the segment set, the first dataset corresponding to the first segmented line segment into a first dataset corresponding to the second segmented line segment, to obtain a third dataset, the second segmented line segment being a segmented line segment in the segment set that has a distance to the first segmented line segment less than the third threshold; and
  determining the second datasets according to a plurality of obtained third datasets.

17. The computing device according to claim 16, wherein the determining the second dataset according to a plurality of obtained third datasets comprises:
  using the plurality of third datasets as the second datasets; or
  performing denoising processing on the plurality of third datasets, to obtain the second datasets.

18. The computing device according to claim 17, wherein the performing denoising processing on the plurality of third datasets comprises:
  obtaining a quantity of pieces of point cloud data in the third dataset and deleting the third dataset in a case that the quantity of pieces of the point cloud data in the third dataset is less than a fourth threshold; or
  obtaining a distance between a center of gravity of feature points represented by the point cloud data in the third dataset and a laser sensor, and a quantity of scanning lines of the point cloud data in the third dataset and deleting the third dataset in a case that the distance is less than a fifth threshold and the quantity of the scanning lines is less than 2.

19. A non-transitory computer-readable storage medium storing a plurality of computer programs that, when executed by a processor of a computing device, cause the computing device to perform a plurality of operations including:
  obtaining target point cloud data by scanning target objects around a vehicle with laser lines;
  clustering the target point cloud data to obtain a plurality of first datasets;
  for each dataset of the plurality of first datasets, fitting feature points represented by point cloud data within the dataset on one segmented line segment, wherein each of the feature points is a respective point on a respective target object; and
  combining the plurality of first datasets according to distances between the corresponding plurality of segmented line segments to obtain a plurality of second datasets, wherein each dataset of the plurality of second datasets includes at least one dataset from the plurality of first datasets.

20. The non-transitory computer-readable storage medium according to claim 19, wherein the clustering the target point cloud data to obtain a plurality of first datasets by:
  searching the target point cloud data for a plurality of pieces of first point cloud data, wherein feature points represented by the plurality of pieces of first point cloud data are adjacent to one another; and
  storing the plurality of pieces of first point cloud data into one created first dataset.

* * * * *